INVENTOR.
FREDERICK G. HORNING
BY
CAROTHERS & CAROTHERS
HIS ATTORNEYS

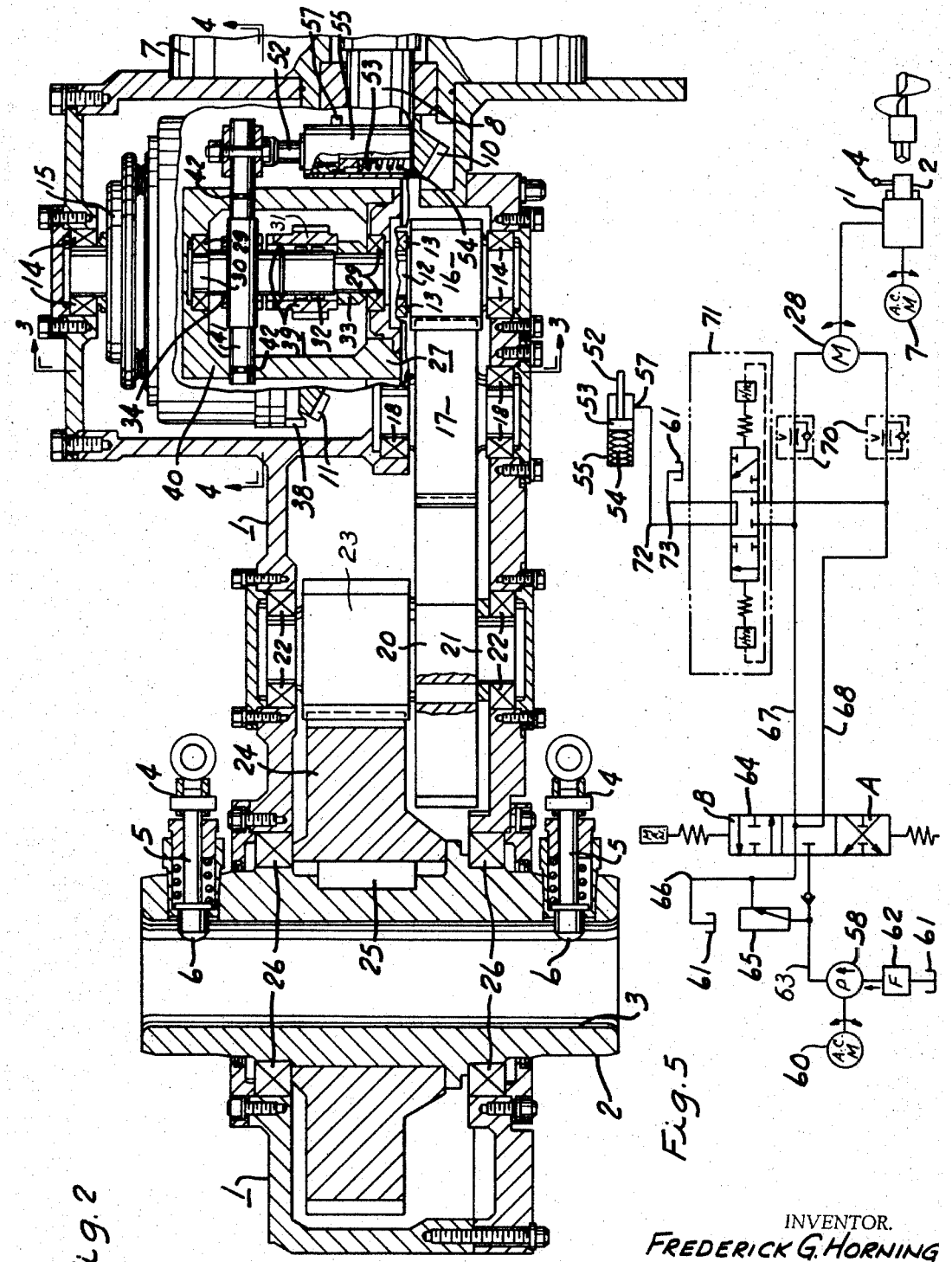

United States Patent Office 3,435,928
Patented Apr. 1, 1969

3,435,928
AUXILIARY DRIVE UNIT TO ALIGN AUGER DRIVE SOCKET WITH AUGER PIN IN MINING ASSEMBLY
Frederick G. Horning, Salem, Ohio, assignor to The Salem Tool Company, Salem, Ohio, a corporation of Ohio
Filed Mar. 3, 1966, Ser. No. 531,544
Int. Cl. F16d 47/00; E21c 1/00; F16k 37/06
U.S. Cl. 192—.096    9 Claims

ABSTRACT OF THE DISCLOSURE

An independent hydraulically operated auxiliary drive to automatically connect into a train of gears for operating an auger mining mechanism to preposition the auger drive socket by rotation for the insertion of an auger section. After inserting the auger pin in the socket a low cost high speed AC squirrel cage motor which is permenantly connected through a friction clutch and gear train to the drive socket drives the auger mining mechanism with full line voltage starting characteristics. The rotatry positioning of the auger socket is made possible by a manually reversible control fluid valve that determines the direction of flow and connects fluid supply lines, each of which has a flow control valve that includes a restriction in parallel with a check valve joined to the opposite sides of a fluid motor. An automatic fluid brake valve is connected to the supply lines ahead of the flow control valves. Either fluid line with pressure automatically actuates and opens the fluid brake valve to supply fluid pressure to actuate a piston in a cylinder that closes a clutch placing the fluid motor in the gear train of the auger mechanism drive. This is completed by the full supply line pressure and when the piston has completed its stroke the system pressure then overcomes the restriction of the flow control valve and the supply lines supply full pressure to the fluid motor to rotate the same until the auger socket or chuck has been turned and aligned to receive the awaiting auger stem. The auxiliary drive motor is then stopped by releasing the manually reversible control fluid valve which shuts off fluid pressure to the supply lines. The auger drive may then be fed forward to insert the auger pin in the auger drive socket and the AC squirrel cage motor started on full voltage to operate the auger mining mechanism.

This relates generally to an auxiliary drive for a fluid operated motor and more particularly to an auxiliary drive to operate as a clutch to engage with the work or driving load before full operation of the fluid motor.

It is well known that D-C electric motors are applied for operating mining machines especially underground mining machinery and other heavy duty equipment. Although the preponderance of power systems today employ A-C supply, the D-C motor is well adapted to mining machinery such as auger mining machinery of the type shown in U.S. patent application Ser. No. 453,622, filed May 6, 1965. This is because D-C electric motors, although they may necessitate a converter installation at some point, have excellent characteristics of providing variable speed control as well as high starting torque which are two needed characteristics in the operation of rotary mining machinery.

However, A-C motors may be substituted as a power supply for D-C motors. The A-C motors are provided with an auxiliary control system in order to provide some variable speed control in the operation of the mining machinery. Where D-C motors supply the power, such speed control may be accomplished by a variable resistance in series with the armature of the motor. Generally, therefore, the D-C motor control is easier and less expensive for mining machinery use.

In the auger mining machinery of the type found in the above mentioned patent application, a D-C electric motor could be applied and operated at a much lower speed than its normal running speed by merely adding a resistance in series with the armature of the motor so that, in effect, the actual impressed voltage on the motor is reduced since there is an additional voltage drop present across the resistance. Since the D-C motor speed will vary approximately directly with the applied line voltage, the speed of the motor will be reduced when the resistance is placed in series therewith.

This operation at a lower speed is necessary in order that auger sections may be properly inserted and removed from the auger mining assembly.

As indicated above, this type of low speed control is useful in auger mining machinery to slowly drive the auger mining assembly and thus permit proper positioning of the auger drive chuck socket for engagement with the end of an auger section and for slowly rotating a complete auger mining assembly to properly position each auger section for removal from the belly plate of the mining machine.

In the places where A-C electric motors must be used in lieu of D-C electric motors, A-C speed control is not possible without an elaborate expensive control system. The induction type motors are generally used in such A-C applications. The wound-rotor type of A-C motors do possess the same speed regulating characteristics as a D-C electric motor. By changing the rotor resistance, the speed for a given torque can be carried through quite a wide range. Also, the wound-rotor motor can be made to develop high starting torque which is desirable in the mining machinery of the type mentioned above. However, the wound-rotor motor is more expensive than the generallly well known type of A-C motor—the squirrel cage induction motor. Furthermore, in order to obtain variable speed control, complex and expensive controls must be utilized. Also, this type of induction motor is not readily available in a Bureau of Mines explosion proof motor or as specified by government standards for operation in underground mining as is the squirrel cage induction motor.

Thus, for best performance at a low cost, it is advantageous to utilize the full line voltage starting characteristics of an A-C squirrel cage motor. There is no need for an elaborate control system. The squirrel cage motor will come up to its rated speed almost instantaneously.

However, the use of an A-C squirrel cage electric motor in lieu of a D-C electric motor presents a problem in auger mining machinery. Due to the ability of an A-C squirrel cage induction motor to reach its rated speed very quickly, it is very difficult to properly position augers for loading and unloading. As previously outlined, auger mining machinery has usually been equipped with D-C motors and a simple variable speed control in order to not only drive the auger assembly at full rated speeding for a mining application but also at slower speeds to properly position the auger drive chuck socket for loading augers in the mining assembly as well as properly positioning the flighting of an auger in order to facilitate its removal from an auger assembly.

Due to the weight and size of the auger sections, it is impractical to handle the auger sections by hand and to properly position the sections without introducing an increased chance of bodily harm to the individuals involved in such handling.

Even though the A-C squirrel cage induction motor is an excellent motor with regard to performance and economy, its ability to reach its rated speed almost instantaneously prevents its application for use at lower speeds to proper positioned auger sections for removal from the auger mining assembly and the auger drive assembly chuck for insertion of auger sections into the auger mining assembly. This problem is further vexed by the momentum of the gear case assembly which makes it virtually impossible to position properly the chuck or the auger sections for insertion and removal of the latter from the auger mining assembly when employing such an A-C motor.

The principal object comprising this invention is the provision of hydraulically operated auxiliary drive unit independent of the A-C electric motor operating the auger mining assembly. The auxiliary drive is connected to the train of gears in the auger drive assembly for intermittent operation of the auger drive chuck to properly position the same for insertion of an auger section into the auger mining assembly or for removal of auger sections from the assembly after they have been properly positioned relative to their flighting.

Another object comprising this invention is the provision of a clutch means which functions to engage and disengage the auxiliary drive from auger drive assembly. Thus, the auxiliary drive functions only when the clutch means is placed into its engaging position and disengages when the auxiliary drive is not in operation. The A-C electric drive motor may then be permitted to drive the auger drive assembly without interference with the operation of the auxiliary drive unit.

Another principal object comprising this invention is the provision of a hydraulic system which initially permits the operation of the clutch means to mechanically connect the auxiliary drive unit to the auger drive assembly before permitting the operation of the auxiliary drive motor.

The term "auxiliary drive unit" is directed to the operation and structure comprising the auxiliary drive itself, which is a hydraulic motor, and the clutch means which, in application, may be a jaw clutch, its shifting collar and associated assembly as well as the jaw clutch shift cylinder to operate the same. In lieu of a shift cylinder it is feasible to employ a rotary type fluid motor to operate the clutch means.

Generally, the structure comprising this invention comprises an auxiliary drive unit which consists of a hydraulic motor which is connected to an output shaft supporting a floating gear and having shift collet slidably engageable thereon. The shift collet is operated axially on the output shaft to permit the engagement of its radially aligned jaw teeth with the jaw teeth on the floating gear. The spur teeth of the floating gear intermesh with the teeth of one of the spur gears making up the train of gears in the auger drive assembly.

The shift collet is operated by a shift collar which is pivotally operated by a shift rod, the other end of which is connected to a fluid operated motor such as a hydraulic cylinder. The hydraulic shift cylinder is single action cylinder with spring biased operation to return the piston to its normal non-actuated position.

Hydaulic pressure is applied to the piston of the jaw clutch shift cylinder in order to rotate the shift rod and thus slidably position the shift collet in engagement with the floating gear on the output shaft of the hydraulic motor. In order to protect the operation of the jaw clutch, flow control valves are provided in the hydraulic fluid lines to the hydraulic motor. Between the fluid supply and the flow control valves, a combination brake valve is connected in parallel with the hydraulic motor to control the operation of the jaw clutch shift cylinder.

The operation of this hydraulic network permits the jaw clutch cylinder to operate before the auxiliary hydraulic motor starts its rotary operation.

Upon operation of the hydraulic control valve for the auxiliary drive unit in either direction, a hydraulic fluid supply is permitted into the network creating a small amount of back pressure due to the employment of flow control valves in the hydraulic supply lines to the hydraulic motor.

This back pressure operates the brake valve to permit the application of hydraulic pressure on the piston of the jaw clutch shift cylinder which operates to engage the jaw clutch. Once the piston has reached the end of its stroke, the pressure in the network becomes sufficient to overcome the back pressure and thus cause the hydraulic motor to commence operation and drive the auger drive assembly sufficiently slow to permit proper positioning of the auger drive chuck or the auger sections in the auger mining assembly whatever the case may be.

Other objects and advantages appear hereinafter in the following description and claims.

The accompanying drawings show for the purpose of exemplification without limiting this invention or the claims thereto certain practical embodiments illustrating the principles of this invention wherein:

FIG. 2 is a sectional plan view taken along the line 2—2 of FIG. 1 with parts broken away.

FIG. 5 is a diagrammatic view of the hydraulic circuit for the auger drive assembly hydraulic motor and auxiliary drive unit.

Figure 1:
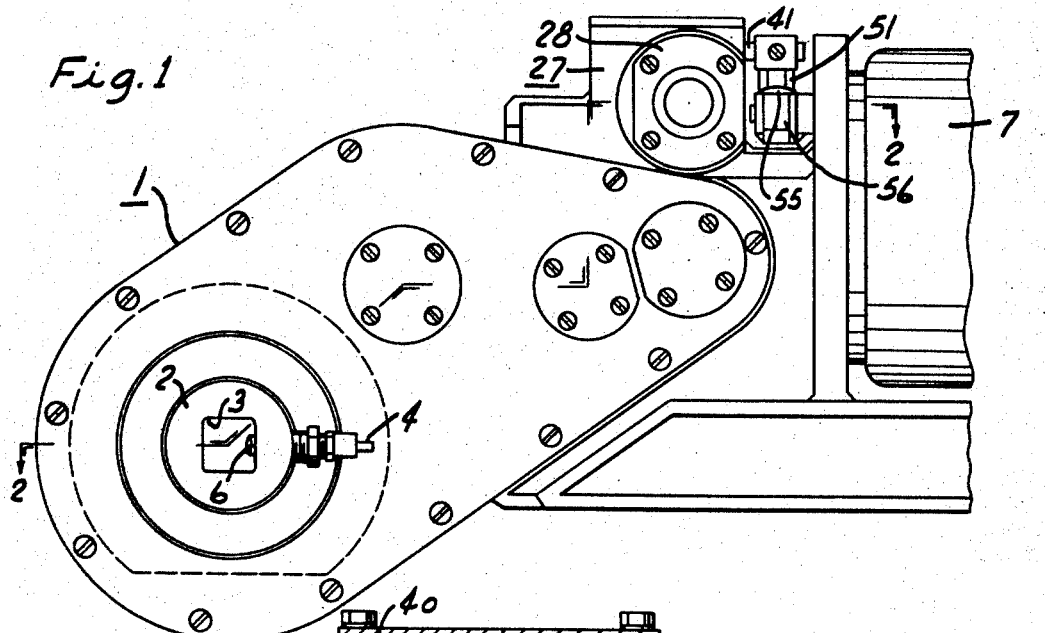
FIG. 1 is a front elevation of an auger drive assembly and the auxiliary drive unit.

Referring to FIGS. 1 and 2, the auger drive mining assembly 1 has an output consisting of the rotary drive chuck 2 which has a polygonal socket 3 for the insertion of a driving of an auger section.

In the particular auger drive assembly 1 shown in the drawings, the chuck 2 is continuous for the full width of the auger drive assembly as well as the socket 3 in order to rotatably drive an auger mining assembly from either side of the auger drive assembly.

The auger drive chuck 2 is provided with auger latches 4 which are merely a spring biased pin 5 inserted in the wall of the socket 2 which has a forward end 6 for insertion in a corresponding opening in the driving of an auger section. Thus, the latch 4 holds the initial auger section in the drive socket 3.

The electric motor 7 drives auger drive assembly 1 to transmit rotary power to the auger mining assembly through the drive chuck 2.

As noted in FIG. 2, the auger drive assembly 1 consists of a train of gears starting from the output shaft 8 of the electric motor 7 to the auger drive chuck 2. The shaft 8 has secured thereto a beveled pinion 10 which intermeshes with the beveled gear 11. The beveled gear 11 is rotatably supported on the shaft 12 by the bearings 13. The shaft 12 is rotatably supported in the housing of the auger drive assembly 1 by the bearings 14. The shaft 12 also supports the slip clutch 15 through which the power is transmitted by the beveled gear 11 to the shaft 12. On the opposite end of the shaft 12 from the slip clutch 15, the spur pinion 16 is fixed to the shaft 12 and transmits the rotary power to the spur gear 17. The gear 17 is rotatably supported in the housing of the auger drive assembly 1 by the bearings 18 as shown in FIG. 2.

The gear 17 intermeshes with the spur gear 20 which is fixed to the shaft 21. The shaft 21 is rotatably supported by the bearings 22 and also supports the pinion gear 23 whose gear teeth intermesh with the gear teeth of the drive chuck gear 24. The drive chuck gear 24 is secured to the drive chuck 2 by the key 25. The drive chuck 2 as well as the drive chuck gear 24 are rotatably supported by the bearings 26.

It will be noted from FIG. 2 that the slip chuck 15 and the spur gear 20 are both keyed to their respective shafts as well as the drive chuck gear 24.

Figure 3:
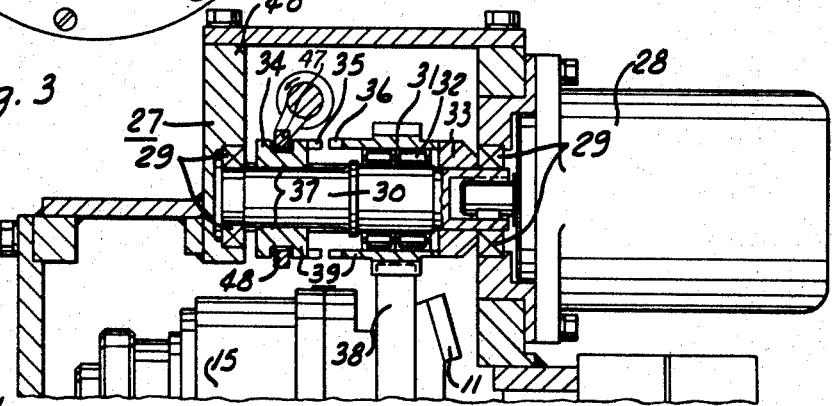
FIG. 3 is a sectional view taken along the line 3—3 of FIG. 2.

In FIG. 2, the shaft 2, slip clutch 15 and associated parts have been cut away to permit clarity in disclosing and describing the auxiliary drive unit 27 comprising this invention which is positioned over the shaft 2 and slip clutch 15 as shown in FIG. 3.

Referring now to FIGS. 2 and 3, the auxiliary drive unit 27 comprises the hydraulic motor 28 which drives the shaft 30. The shaft 30 is rotatably supported by the bearings 29 and rotatably supports the pinion gear 31 of the jaw clutch 39 by the bearings 32. The shaft 30 also supports the bearing ring 33. The other end of the shaft 30 slidably supports the jaw clutch 39 shift collet 34 which has a clutch engaging surface 35 which consists of a series of tooth membres for engagement of the tooth members 36 on the jaw clutch pinion gear 31. The shaft 30 is splined at one end on opposite sides of the shaft to permit the slidable insertion of the shift collet 34 at this end of the shaft. Thus, the shift collet 34 may be either slidably keyed to the shaft 30 or have internally disposed axial extensions which correspondingly fit the splined shaft 30 for slidable, but non-rotary, movement thereon. The shift collet 34 may be positioned axially on the shaft 30 to engage the clutch surface 36 of the pinion gear 31. The bearing ring 33 provides a bearing support for the pinion gear 31 when the shift collet 34 is in engagement therewith.

As seen in FIG. 2, it will be noted that the teeth of the pinion gear 31 intermesh with the teeth of the spur gear 38 which is keyed, along with the bevel spur gear 11, to the rotary shaft 12. Thus, it can be seen from the description thus far that the hydraulic motor 28 is mechanically connected through clutch 39 to the auger drive assembly 1.

Figure 4:
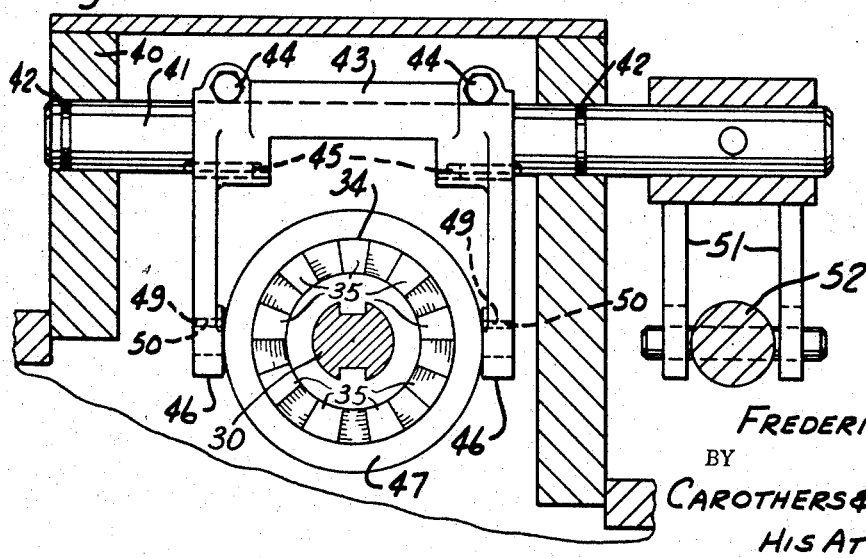
FIG. 4 is a sectional view taken along the line 4—4 of FIG. 2.

As shown in FIGS. 2 and 4, the structure for the operation of the clutch 39 is shown. The auxiliary drive unit housing 40 supports the rotary shaft 41 which is rotatably supported on the bearings 42 in the housing 40. The bifurcated throw-out yoke 43 is secured to the shaft 41 by means of the clamping bolts 44. The throw-out yoke 43 may also be keyed to the shaft 41 as shown at 45.

The bifurcated ends 46 of the yoke 43 rotatably support the shifting collar 47 which fits in the annular groove 48 of the shift collet 34.

As shown in FIG. 3, the shifting collar 47 has sufficient clearance between its inner annular surface and the bottom and sides of the slot 48 to permit the shift collet 34 to rotate within the shift collar 47 when the law clutch 39 is being driven by the motor 28. Further, it will be noted upon viewing FIG. 4 that the openings 50 in the bifurcated ends 46 provide sufficient clearance to permit forward movement of the jaw clutch as retained by the yoke 43. Upon counterclockwise rotation of the shaft, as indicated by the arrow in FIG. 3, shift collet 34 is permitted to move toward engagement with the pinion gear 31, the required distance which is determined by the amount of clearance 49 provided in the openings 50.

The other end of the shaft 41 extends outside the housing 40 and has secured thereto the linkage 51 for connection of this end of the shaft 41 to the piston rod 52 which is connected to the piston 53 being spring biased by the spring 54 in the cylinder 55. The cylinder 55 is securely attached in any suitable manner to a stationary structure as indicated at 56. Thus the hydraulic power means just described is connected mechanically and hydraulically to actuate the clutch means 39 to engage the auxiliary hydraulic motor 28 with the auger drive assembly 27.

As it can be seen from FIGS. 2, 3 and 4, upon hydraulic operation of the pistons 53 in the cylinder 54 through the port 57, the shaft 41 will rotate the throw-out yoke 43 which will slidably move the shift collet 34 on the shaft 30 into engagement with the clutch surfaces 36 of the pinion gear 31. Upon release of the hydraulic pressure supplied to the port 37, the spring 54 will operate to rotate the shaft 41 in a clockwise direction, upon viewing FIG. 3, and thus disengage the shift collet 34 from the jaw teeth 36 of the floating pinion gear 31.

Referring to FIG. 5, there is shown a diagrammatic view of the hydraulic circuit or system for the operation of the auxiliray drive unit wherein the hydraulic pump 58 is operated by the electric motor 60 which pumps hydraulic fluid from the oil reservoir 61 through the oil filter 62 and supplies the same through line 63 to the reversible control hydraulic fluid valve 64. The hydraulic fluid line 63 is provided with a relief valve 65 which will operate at a maximum predetermined pressure to direct the hydraulic fluid supplied through the line 63 through the return line 66 and thence back to the hydraulic fluid reservoir 61. Thus, the relief valve 65 acts as a safety valve in the hydraulic system.

As it can be seen from FIG. 5, the hydraulic fluid can be provided to operate the auxiliary drive unit either through supply line 67 or supply line 68 leading to the auxiliary drive motor 28. Flow control valves 70 each providing as shown a restriction and a check valve in parallel and are provided in each of the hydraulic fluid lines 67 and 68 to the auxiliary drive motor 28. The combination brake valve 71 is connected in parallel with the motor 28 and connected by the hydraulic fluid lines 67 and 68 between the control valve 64 of the flow control valves 70. The hydraulic pressure in the system will operate the combination brake valve 71 which has one line 72 connected to the port 57 of the jaw clutch shift cylinder 55 and its other line 73 connected as a return to the hydraulic fluid reservoir 61. Thus, when the combination brake valve 71 is in its normal position, as shown in FIG. 5, line 72 is connected to line 73 in order to release any fluid pressure from the shift cylinder 55 to the fluid tank reservoir 61.

Shown diagrammatically in FIG. 5, is the connection of the auxiliary drive motor 28 to the auger drive assembly 1 as well as the connection of the auxiliary drive motor 7 to the auger drive assembly 1 as previously described in detail with FIGS. 2, 3 and 4.

It readily can be seen that upon shifting of the control valve in either position A or position B, fluid pressure will be supplied to the respective flow control valve 70 which will not immediately permit the operation of the hydraulic motor 28 since the combination fluid brake valve 71 is connected in parallel therewith permitting the performance of the hydraulic work initially on the brake valve rather than through the flow control valve 70. Thus, the flow control valve 70 insures that there is a sufficient amount of back pressure in the system in order to initially operate the combination brake valve depending upon fluid pressure being applied in either of lines 67 or 68 which in turn shifts the brake valve 71 and thus permits the hydraulic fluid to be applied to the jaw clutch cylinder 55. The shifting of the brake valve 71 as well as the engagement of the jaw clutch 39 through the clutch shift cylinder 55 is made possible by the above mentioned back pressure developed in the system due to the employment of the flow control valves 70 and represents a hydraulic power means.

Once the piston 53 reaches the end of its stroke, pressure continues to build up in the system and thus eventually overcomes the back pressure which results in the operation of the hydraulic motor 28 through the flow control valve 70 which, due to the heightened pressure of the system, permits the passage of hydraulic fluid to the motor.

It can already be seen that the operation of the hydraulic motor 28 to drive the auger drive assembly 1 at a sufficiently low speed to properly position auger sections in the auger mining assembly will be delayed until the jaw clutch shift cylinder 55 is operated through the brake valve 71.

Upon release of the hydraulic fluid pressure from the hydraulic system shown in FIG. 5 by returning the control valve 64 to its normal position, the brake valve 71 will return to its normal position and permit the spring 54 to return the piston 53 to its original position and thus return the fluid supply through line 72 and 73 to the tank reservoir 61. The return of the piston 53 to its normal position in the cylinder 55 also rotates the shaft 41 in a clockwise direction, upon viewing FIG. 3, to disengage the shift collet 34 from the jaw teeth member 36 of the floating pinion gear 31. With the hydraulic motor 28 disengaged from the auger drive assembly 1, the A-C electric motor 7 may be operated to drive the auger drive assembly at a higher speed for normal auger mining operation.

It is already apparent from the above that the hydraulic drive unit comprising this invention eliminates the need of auxiliary control systems which are not only more complex in the control of A-C motor machinery but also are not as economically feasible as the present hydraulic drive unit disclosed herein. Also, the hydraulic auxiliary drive unit comprising this invention permits the use of a squirrel cage induction motor 7 which not only is already available for operation in such mining equipment under government underground mining standards but also has the advantage of almost reaching its rated speed of operation instantaneously.

The embodiment shown in the drawings and described above is given merely for the purpose of explanation and illustration without intending to limit the scope of the claims to the specific detail disclosed or to the specific embodiment of this invention directed to an auger mining machine application. It should be understood that the description of the preferred form of the invention is for the purpose of complying with Section 112, Title 35 of the United States Code and that the claim should be construed as broadly as prior art will permit.

I claim:

1. An auxiliary drive unit for a rotary mining machine assembly including an electric powered fluid pump for operating through a reversible control fluid valve and line, a rotary fluid motor mounted to drive said rotary mining machine assembly and including a flow control valve connected in each side of a fluid line between said reversible control fluid valve and said fluid motor, a reversible fluid brake valve connected for operating to each side of said fluid line ahead of said flow control valves, the reversible output of said fluid brake valve connected to control a fluid shift cylinder to actuate a jaw clutch connecting said fluid motor drive with said rotary mining machine assembly, said flow control valves retarding the operation of said fluid motor until after said fluid shift cylinder of said jaw clutch has reached the end of its stroke to engage said jaw clutch and thereafter build up pressure through said flow control valves to operate said fluid motor in the selected direction through said reversible control fluid valve.

2. The auxiliary drive unit for the rotary mining machine assembly of claim 1 wherein said electric powered fluid pump is operated by an alternating current electric motor.

3. The auxiliary drive unit for the rotary mining machine assembly of claim 1 wherein said electric powered fluid pump is operated by an electric motor.

4. The auxiliary drive unit for the rotary mining machine assembly of claim 1 wherein said fluid shift cylinder is spring actuated in one direction.

5. The auxiliary drive unit for the rotary mining machine assembly of claim 1 wherein said reversible fluid brake valve is an automatic fluid shift pilot cylinder for operating the valve element in each direction from said fluid line and is provided with a spring return to its non-operating position.

6. In an auger drive assembly for the transmission of rotary power to an auger mining assembly, an auxiliary drive unit comprising a single reversible auxiliary hydraulic motor, a hydraulic flow control valve in both hydraulic lines from a controlled and reversible source of hydraulic pressure to each side of said auxiliary hydraulic motor, clutch means connected to be driven by said hydraulic motor, hydraulic power means connected to engage said clutch means to drive said auger mining assembly, an automatic fluid brake valve having an operating connection to each of said hydraulic lines ahead of said hydraulic flow control valves, a hydraulic line from said fluid brake valve to said hydraulic power means to supply hydraulic pressure when said fluid brake valve is energized to operate said clutch means to engage said auxiliary hydraulic motor with said auger mining assembly before rotating said auxiliary hydraulic motor.

7. The auxiliary drive unit of claim 6 characterized in that said clutch means includes a jaw clutch comprising a shift collet secured for axial, non-rotary movement on a shaft rotatably driven by said hydraulic motor, a pinion gear rotatably supported on said shaft and interconnected with said auger mining assembly, annually disposed teeth on said shift collet and said pinion gear, said hydraulic power means to slidably engage said shift collet teeth with said pinion gear teeth to interconnect said auxiliary hydraulic motor with said auger mining assembly.

8. The auxiliary drive unit of claim 7 characterized in that said hydraulic power means includes a spring biased hydraulically operated piston and cylinder connected to axially move said shift collet on said shaft in clutch engagement with said pinion gear before its operation of said auxiliary hydraulic motor to drive said auger drive assembly.

9. The auxiliary drive unit of claim 7 characterized in that said hydraulic power means includes a hydraulically operated motor connected to axially move said shift collet on said shaft into clutch engagement with said pinion gear before its operation of said auxiliary hydraulic motor to drive said auger drive assembly.

References Cited

UNITED STATES PATENTS

| 2,905,441 | 9/1959 | Poundstone | 299—1 |
| 3,019,669 | 2/1962 | Cozzo et al. | 74—661 |
| 3,127,790 | 4/1964 | Howey | 74—661 |
| 3,209,871 | 10/1965 | Moericke. | |

BENJAMIN W. WYCHE III, *Primary Examiner.*

U.S. Cl. X.R.

74—665; 192—.084; 299—1